April 22, 1924.  
C. CATTANACH  
1,491,030  
VALVE FOR GRAIN OR OTHER FREE RUNNING NONLIQUID MATERIALS  
Filed Jan. 20, 1921

INVENTOR
CHARLES CATTANACH

BY Fetherstonhaugh & Co'y
ATTYS.

Patented Apr. 22, 1924.

1,491,030

UNITED STATES PATENT OFFICE.

CHARLES CATTANACH, OF PORT ARTHUR, ONTARIO, CANADA.

VALVE FOR GRAIN OR OTHER FREE-RUNNING NONLIQUID MATERIALS.

Application filed January 20, 1921. Serial No. 438,791.

*To all whom it may concern:*

Be it known that I, CHARLES CATTANACH, a subject of the King of Great Britain, a resident of the city of Port Arthur, District of Thunder Bay, Province of Ontario, Dominion of Canada, have invented certain new and useful Improvements in Valves for Grain or Other Free-Running Nonliquid Materials, of which the following is a specification.

My invention relates to improvements in valves for grain or other free-running, nonliquid materials, in which a two-part flat plate double acting valve is so made as to meet at or near the centre of the orifice to be controlled by the valve, the plate parts being reinforced by angle bars so placed as to form a seal when the two parts meet, and the objects of my improvement are to provide a two-part valve worked as a single valve and giving a much quicker opening with shorter lever or rack and pinion movement, and its application to scales, bins, tanks or other containers for the storage of all free-running material not liquid or semi-liquid in substance and the quick and efficient transfer of the materials to other scales, bins, belts, tanks, boats, cars or other containers.

I attain these objects by the mechanism illustrated in the accompanying drawing, in which:—

Figure 1:
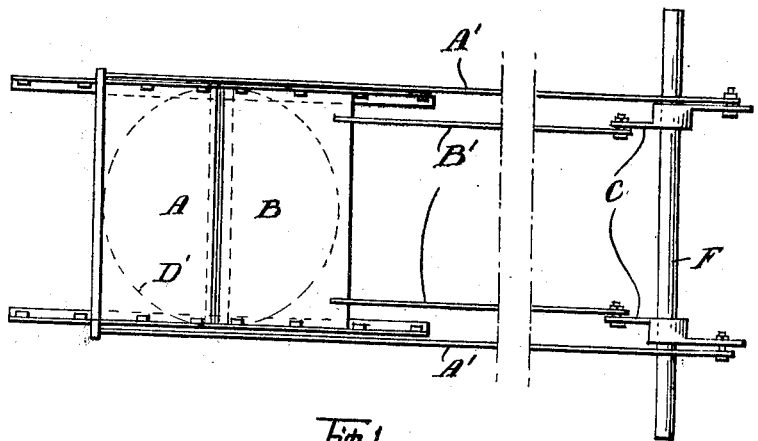
Figure 3:
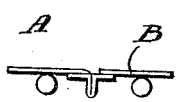
Figure 2:
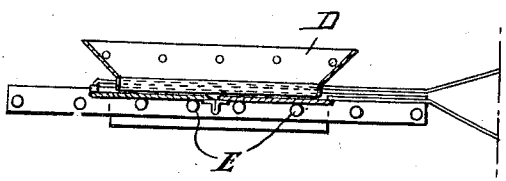
Figure 2:
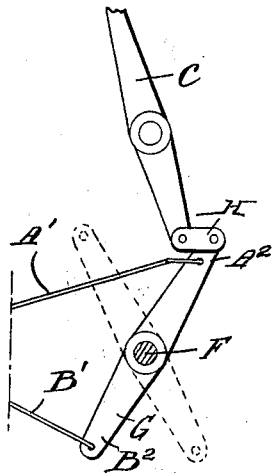

Figure 1 is a plan view.
Figure 2 is a sectional elevation.
Figure 3 is a sectional detail.

In the drawings:

D represents the valve casing having an outlet D' and provided with reciprocating valve plates A and B adapted to be carried on rollers E. A' and B' are rods for the plates A and B joined at their outer ends to the opposite ends $A^2$ and $B^2$ of a lever member G fixedly mounted on a rocking shaft F, this member G being, in turn, link connected at one end through a link H with a second lever member C, whereby, on the lever C being operated, the lever G operates the rocking shaft F, which, in turn, through the rods A' and B' operates the plates A and B to open or close the valve outlet D'.

As many changes could be made in the above construction and many widely different embodiments of my invention within the scope of the claim constructed without departing from the spirit or scope thereof, it is intended that all matter contained in the accompanying specification and drawings shall be interpreted as illustrative and not in a limiting sense.

What I claim as my invention is:

A valve for grain or other free-running non-liquid material comprising a casing having an outlet, a pair of double-acting reciprocal plates for said outlet, means for operating the plates comprising rods connected to the plates at one end and connected at their other end to a lever member fixedly mounted on a rock shaft, said lever member being connected at one end to a second lever member whereby on the second lever member being operated the plates are in turn operated to open and close the valve outlet.

In witness whereof I have hereunto set my hand in the presence of two witnesses.

CHAS. CATTANACH.

Witnesses:
MARY NIVEN CATTANACH,
R. C. POWELL.